March 21, 1944.   S. N. ROSENGREN   2,344,832
COWL FASTENER
Filed July 22, 1942
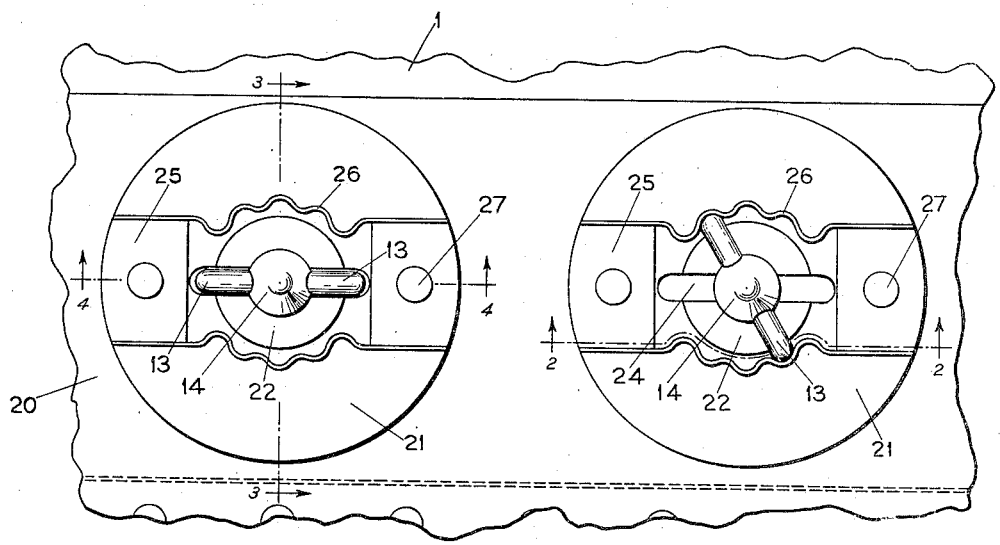
Fig. 1
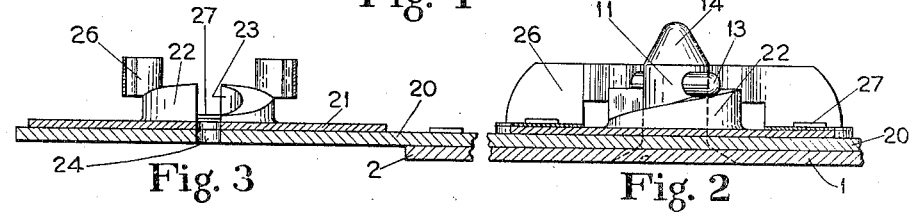
Fig. 3    Fig. 2
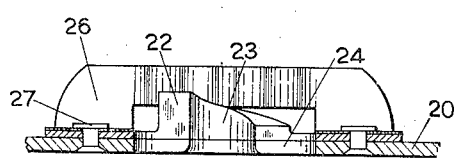   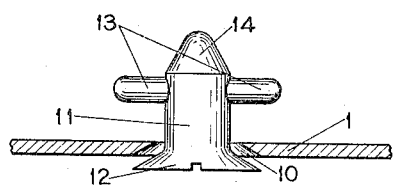
Fig. 4    Fig. 5
SWAN NORMAN ROSENGREN
Inventor
Reynolds & Beach
By
Attorneys Patented Mar. 21, 1944

2,344,832

UNITED STATES PATENT OFFICE 2,344,832

COWL FASTENER

Swan Norman Rosengren, Seattle, Wash.

Application July 22, 1942, Serial No. 451,839

4 Claims. (Cl. 24—221)

Many types of fasteners for aircraft cowlings have been proposed heretofore, but almost without exception they have been unsatisfactory for one reason or another. Some have been too bulky, so that they could not be incorporated in cramped locations, or, when used in quantities, have added too much to the weight of the airplane. Others have been incapable of holding the parts securely, particularly after being used for a considerable period of time and having become worn. Many required an inordinate amount of time to secure and to release, thus greatly delaying servicing operations. Still others did not provide a positive lock, but occasionally would come unfastened or would work loose and vibrate. Few were capable of reliably transmitting any appreciable load, particularly shear stresses, from one part to another. Cowl fasteners incorporating spring sockets have been subject to failure upon breakage of the springs. Other fasteners have been prohibitively costly, having required intricate machine work or extremely accurate fabrication in their manufacture. Some fasteners incorporated small, loose parts which were easily lost. With my cowl fastener all these defects are eliminated.

A typical use for my cowl fastener is to join together the overlapping edges of two sheets. It comprises two main elements, one element being carried by the edge of one sheet, and the other element by the edge of the other sheet. On the inner face of the inner sheet edge is secured a wedging socket element, while a locking pin for insertion into the socket element pierces the overlapping edge of the outer sheet. The pin preferably has a so-called flat head, namely, one which is flat on the end and frusto-conical on the under side to fit into a countersunk hole in the sheet. Spaced from the head are lugs projecting laterally from the pin shank, and beyond these lugs the pin end may be of substantially conical shape to facilitate its insertion into the socket element. Although preferably the pin has more than one lug, two or three lugs are sufficient. Two opposite lugs may conveniently be cylindrical and formed by the ends of a cross rod pressed into a diametrically transverse aperture through the pin shank.

The socket member secured to the joining edge of the other sheet includes a boss which has a central bore of a size to receive snugly the shank of the pin. In addition this bore has a cross slot through which the lateral lugs of the pin may move. At each side of this cross slot the boss is shaped as a helical wedging or cam ledge, and these ledges on opposite sides of the cross slot slope in the same sense, preferably both being inclined helically in a right hand direction, rather than being symmetrical. Alongside each wedging ledge is a laterally yieldable sinuous spring band which is medially of arcuate shape substantially concentric with the socket bore, to engage the end of a pin lug.

As the joining edges of the two sheets are overlapped the pin can be rotated manually, such as by engagement of a screwdriver or similar tool with a screwdriver slot or equivalent socket in the pin head. Its conical inner end leads the pin into the bore of its socket, and when the two elements are rotated into their proper relative relationship the lateral pin lugs will move through the cross slot in the socket member by axial movement of the pin into positions each beyond the lower end of its helical ledge. Rotation of the pin in a right hand direction will now simultaneously slide the lugs up their respective wedging ledges and force the sinuous spring bands radially outward to allow the lugs to snap from one station, formed by a radially inwardly facing spring band trough, to the next.

The wedging engagement of the lugs and ledges will draw the pin head and socket member toward each other, thus forcing the joining edges of the sheets into intimate face-to-face contact. When the lugs have reached their limiting positions along the wedging ledges, completing this operation, retrograde rotation of the pin will be resisted by engagement of the lug ends with the sinuous spring bands. Nevertheless all stresses will be transmitted from one sheet to the other through engagement of the pin and socket bore and through the lugs and wedging ledges, rather than through the springs. Consequently no appreciable force will be exerted on the springs tending to disengage the lug ends from them.

It is therefore a principal object of my invention to provide a cowl fastener incorporating a pin and socket having positive wedging engagement which may be operated quickly and easily to draw the joining edges of two sheets tightly together, and which will hold the sheet edges securely in such relationship indefinitely. Such positive engagement is made possible despite warpage of the sheet edges, slight variations in thickness of the sheets, or inaccuracies of fabrication.

It is a further object, upon completion of such securing operation, to lock the cooperating parts of the fastener in interengaged relationship automatically, so that they will not become disengaged despite weaving of the sheets or the transmission of heavy stresses from one to the other.

In addition it is an object to provide a cowl fastener which will be capable of transmitting substantial loads from one sheet edge to the other, particularly in shear and bending of the pin, corresponding to tension, compression or relative twisting of the sheet edges.

All these objects are obtained by a fastener of simple design, having few parts, and hence capable of economical fabrication. Moreover it has a high strength to weight ratio and incorporates no critical part stressed much higher than the other parts, and hence likely to fail. Although such fastener is compact, all members of each principal element are inseparable, so that no small part may inadvertently drop out and become lost.

The fastener which is illustrated in the accompanying drawing may be modified in various ways according to the particular use to which it is to be put, while preserving the basic principle of operation, but the form shown will be found to be suitable for most purposes.

Figure 1 is a plan view of the under side of a portion of a joint incorporating two of my fasteners, one fastener being shown in locked position and the other unlocked. Figure 2 is a vertical section through the fastener in locked position in Figure 1, taken along line 2—2 of that figure.

Figure 3 is a vertical sectional view through the socket member alone on line 3—3 of Figure 1. Figure 4 is a further vertical sectional view through the socket member alone taken perpendicularly to the view of Figure 3 along line 4—4 of Figure 1.

Figure 5 is an elevation view of the pin mounted in its sheet, taken along line 4—4 of Figure 1.

The overlapping edge of plate 1 has a countersunk hole 10 in it through which the shank 11 of the cowl fastener pin member extends. While, when pressed fully in, the conical under side of the pin's flat head 12 would fit the countersunk hole accurately, it is preferred that the shank of the pin fit loosely in such hole, so that the pin may be tilted, if necessary, in any direction to start its inner end easily into its socket. When the flat head is received in the plate's aperture its outer face will not project beyond the outer plate surface, as shown in Figure 2, but will lie flush with it or may even be recessed slightly. One or more lugs 13 projecting laterally from the end of the pin opposite its head may serve to prevent removal of the pin from hole 10. The spacing between the head 12 and the lateral lugs 13 will be much greater than the thickness of plate 1, and the intervening portion of the pin shank is preferably cylindrical.

If the end of the pin 14 opposite its head 12 and beyond lugs 13 is tapered generally conically, as illustrated, it will guide the pin shank readily into the socket member, but such pin end may merely be rounded or even flat. In order to simplify fabrication of the pin element and enable it to be secured in sheet 1, there may be two lugs 13 formed by opposite ends of a cylindrical rod pressed into or otherwise secured in a hole extending diametrically through the pin shank 11. The rod will be thus assembled in the pin after the pin has been inserted through the plate hole 10. It is not essential that lugs 13 be of cylindrical shape, but this is a convenient and economical construction. It is desirable, however, that the sides of each lug toward head 12 be slightly curved transversely and the outer end of each lug be rounded at least about an axis parallel to the pin shank 11. The reason for thus shaping the lugs will be discussed hereafter.

The socket member, with which the pin element described above engages, is mounted upon an extension or lap plate 20 secured to the inner face of the other plate's joining edge 2 by rivets, welding, or the like. When this extension plate overlies the adjoining edge of plate 1, therefore, the outer surfaces of the two plates 1 and 2 will be flush. The socket element consists of a base 21, which conveniently may be circular, from the central portion of which a boss upstands. This boss incorporates arcuate ledges 22 fringing an aperture 23 in the base 21, one for each pin lug 13. This aperture is of a size such that the pin shank 11 will fit snugly into it, as shown in Figure 1. Radial slots 24 permit entrance of lugs 13 into the socket member. It is necessary, of course, that extension plate 20 be apertured similarly to the socket base, as shown in Figure 4.

Each arcuate ledge 22 has its upper surface formed substantially as a helix, so that all radial elements of its upper surface are approximately perpendicular to the axis of aperture 23. The helical upper surfaces of the ledges rise in the same sense, preferably all right hand. If pin shank 11 has two lugs 13 two ledges will be provided, separated by two aligned cross slots 24 disposed diametrically of aperture 23. At each cross slot end the taller end of one ledge will be opposite the shorter end of the other ledge. The socket member further includes a spring element of generally channel shape, comprising base portions 25 located adjacent to the ends of radial slots 24. The flanges 26 of this spring element, between the base portions 25, form generally arcuate bands substantially concentric with bore 23, one alongside but spaced slightly outward of each ledge 22, which are sinuous or corrugated. The spring element bases 25, socket base 21, and lap plate 20 may all be secured permanently together by rivets 27 having flush outer heads, or by spot welding, brazing, or the like.

Before the pin and socket members are interengaged the pin fits loosely in plate 1, as shown in Figure 5. When the conical end 14 of the pin is generally aligned with bore 23 of the socket member and lugs 13 are in a rotative position registering with radial slots 24 of the socket member, the pin may easily be pushed into and through bore 23 until the lower surfaces of lugs 13 are above the upper surfaces of the shorter ends of ledges 22. This relationship of the parts is shown at the left of Figure 1. The pin may now be rotated right handed, in a counterclockwise direction as viewed in that figure, by insertion of a suitable tool into a complemental recess in the head of the pin, into the position shown at the right of Figure 1.

As the pin is rotated approximately 30° the ends of lugs 13 will come into engagement with the sinuous portions of the spring bands 26, for the radial spacing of the inwardly facing crests of these spring elements from the axis of bore 23 will be considerably less than the radial extent of lugs 13 from the axis of the pin shank 11. The inwardly facing troughs of such sinuous portions will not be spaced farther from the axis of the bore 23 than such radial extent of the lugs, and may be slightly closer. As rotation of the pin is continued the ends of lugs 13 will simultaneously force the spring bands 26 radially outward to enable each lug end to progress past the first inwardly facing crest engaged, for reception in the trough immediately beyond it. Each trough of these spring bands will be substantially complemental to the ends of the lug in plan, as seen in Figure 1, and will be located to engage contiguously a lug end fitted in it, either with the spring unstressed or held slightly outward from its neutral position.

During this rotation of the pin shank in the socket the curved lower surfaces of lugs 13 have been riding up along the upper surfaces of the cam ledges, and thereby exerting a wedging action tending to draw the pin head, and in turn plate 1, toward plate 20. Right hand rotation of the pin may be continued to snap the ends of the lugs 13 successively from one station to the next, until the under surface of plate 1 has been drawn tightly against the outer surface of lap plate 20. During each such movement the lugs, by engagement with inwardly directed spring crests, will force the spring bands radially outward until the end of each lug moves into registry with the succeeding trough of its spring band. The crests of the spring bands are preferably arranged angularly so that each lug will click from one retaining trough into the next simultaneously, to prevent inadvertent rotation of the pin in bore 23. Where the pin has two diametrically projecting lugs the crests of the opposite spring bands are preferably aligned diametrically of bore 23, and adjacent crests are spaced apart an angle of approximately 30°.

As the pin is rotated from one station to the next plates 1 and 20 will be drawn progressively closer together by the above mentioned wedging engagement of the lower surfaces of lugs 13 with the upper surfaces of cam ledges 22. Ordinarily the parts will be fabricated sufficiently exactly so that the inclination of the upper surfaces of ledges 22 need not be great. Furthermore the parts ordinarily will not warp sufficiently to require excessive axial movement of the pins into bore 23 against a substantial resistance. Where such conditions obtain the axial movement of pin shank 11 into bore 23, though appreciable, is moderate as the lug ends snap from one spring trough station to the next.

If for some reason the pitch or inclination of the upper cam surfaces of ledges 22 must be substantially greater than ordinarily would be required, it may be desirable to provide more lug holding stations, so that the pin need not be rotated through an angle as great as 30° between stations. This may be achieved by making the corrugations of the spring band 26 smaller and forming the ends of the lugs 13, instead of rounded, of more nearly conical or wedge shape. Another alternative is to lengthen lugs 13 and move the spring bands 26 outward correspondingly, so that the same length of band arc, without change in the number or size of the corrugations, will subtend a smaller angle, and hence adjacent corrugations will also be spaced apart a smaller angle.

To increase the number of stations where the pin has two lugs 13 without either lengthening the lugs or changing the shape of their ends, the opposite spring bands may be arranged so that a trough of one band will be diametrically opposite a crest of the other band. With this construction only the end of one lug at a time will be seated in a trough, while the end of the other lug will be engaged with a crest. The same principle may be applied where more than two lugs are used, either by changing the relative angular disposition of the spring bands on the socket member, or of the lugs on the pin. This type of construction is not preferred, however, because the pin will not be held nearly as firmly against rotation by engagement of only one lug in a trough as by simultaneous engagement of a plurality of lugs each in its respective trough.

Where the construction illustrated is employed, namely, where the inclination of the upper surfaces of ledges 22 is gradual, the wedging action produced by rotation of the pin is great, and will draw the plate 1 very tightly against lap plate 20. All movement of these plates in a direction perpendicular to them will therefore be prevented, and they will further be held against sliding in any direction parallel to them by the snug engagement of pin shank 11 in bore 23. Shear stresses between the plates are therefore readily transmitted by the pin and socket engagement, because of the large area of contact between these members, in any radial direction in which a force might be exerted.

Moreover, any tendency of the pin 11 to move laterally relative to the socket member would cause one or another of lugs 13, if more than one are used, to ride farther up its respective cam ledge, which would produce a shearing action upon the lug resulting in pin shank 11 being tensioned. Upon introduction of a shearing force between the plates, therefore, they would tend to be drawn into tighter face-to-face contact, and the shear would be resisted by three factors, namely, increased surface friction between the plates, shear reaction forces in pin shank 11 and the socket member boss, and tension in the pin shank with corresponding compression in that ledge 22 toward which the shearing force between the plates 1 and 20 tends to move the pin, accompanied by shear in the lug which engages such ledge.

It will thus be seen that while my fastener is very compact, it secures parts together positively and in a manner to afford a joint having maximum strength characteristics. Moreover, the pin and socket elements may be engaged or disengaged quickly and easily, and when disengaged none of the parts are free so that they may be lost. Despite such ease of operation, when the pin and socket members have been placed in securing relationship the action of the radially yieldable spring bands 26 positively insures that the parts will not be accidentally disengaged. Little danger of spring failure exists even when the elements are engaged, because there is little or no strain on the spring bands constructed as shown, yet if a spring should fail the fastener would not be rendered inoperative. It would be extremely improbable that two spring bands would break at nearly the same time, since the elements do not depend primarily upon such bands to retain them in engagement, but rather the friction between the under surfaces of lugs 13 and the upper surfaces of ledges 22 acts to deter relative rotation of the pin and socket members, and may in itself be sufficient, except perhaps in cases of extreme vibration, to prevent disengagement of the lugs from the ledges. Moreover breaking of one spring band would place no appreciably greater load on the other band, and the locking action of the latter would still supplement the friction between the parts to retain the elements in engagement.

What I claim as my invention is:

1. A fastener for securing together two sheets or the like in face-to-face relationship, comprising a pin irremovably held in a hole in one sheet by a head on the pin shank larger than such hole and disposed at one side of the sheet, and by a lug spaced from said head and projecting laterally from the pin shank at the other side of such sheet to an extent, with the pin shank, exceeding the size of the hole in the sheet, and a socket member carried by the other sheet, having an aperture adapted to receive said pin shank therein, a slot for projection therethrough of said pin lug, an inclined ledge upstanding from said socket member, engageable by said pin lug upon relative rotation of said pin and socket member in one direction, to draw said pin positively into said aperture, and sinuous spring means yieldable outward laterally of said pin by engagement of said lug therewith during such rotation of said pin relative to said socket member, said lug being engageable in any one of a plurality of radially inwardly facing troughs of said spring means for restraining relative retrograde rotation of said pin and socket member.

2. A fastener for securing together two sheets or the like in face-to-face relationship, comprising a pin member having a lug projecting laterally therefrom, a socket member adapted to receive said pin member therein, and having an uninterrupted helical ledge engageable by said lug upon relative rotation of said pin and socket members in one direction, to produce a positive wedging action tending to draw said pin member into said socket member, and a generally arcuate sinuous band carried by said socket member and having a plurality of troughs facing radially inward toward such socket corresponding to different rotative relationships of said pin and socket members, engageable one at a time with the radially outward end of said lug to restrain relative retrograde rotation of said pin and socket members.

3. A fastener for securing together two sheets of the like in face-to-face relationship, comprising a pin member having a plurality of lugs projecting laterally therefrom, a socket member adapted to receive said pin member therein, and having helical ledges, one engageable by each lug upon relative rotation of said pin and socket members in one direction, to produce a positive wedging action tending to draw said pin member into said socket member, and a generally arcuate sinuous spring band carried by said socket member and having a plurality of troughs engageable one at a time with the end of a lug to restrain relative retrograde rotation of said pin and socket members, but yieldable outwardly laterally of said pin member to release the lug end for movement thereof from one band trough to the next past the intervening band crest.

4. A fastener for securing together two sheets or the like in face-to-face relationship, comprising a pin, a transverse rod fixed in position extending diametrically through said pin and projecting laterally from each side thereof, a socket member including a central aperture of a size to receive the pin shank therein, and having a cross slot for reception of the end portions of said rod, two helical ledges fringing said aperture and engageable by the opposite end portions of said rod to exert a wedging action by relative rotation of said pin and socket member, to draw said pin into said socket member, and a generally arcuate sinuous spring band alongside each helical ledge, engageable by the outer ends of said cross rod and yieldable outward laterally of said pin under pressure of said rod ends, to enable each cross rod end to snap from one spring trough to the next past the intervening spring crest.

SWAN NORMAN ROSENGREN.